United States Patent [19]

Tunnicliffe

[11] 4,105,061
[45] Aug. 8, 1978

[54] PRESSURE VESSELS

[75] Inventor: George Tunnicliffe, Newcastle-under-Lyme, England

[73] Assignee: Corning Limited, Sunderland, England

[21] Appl. No.: 744,853

[22] Filed: Nov. 24, 1976

[30] Foreign Application Priority Data

Dec. 1, 1975 [GB] United Kingdom ............... 49271/75

[51] Int. Cl.² ............................................. B22C 21/00
[52] U.S. Cl. ...................................... 165/1; 220/426; 23/252 R
[58] Field of Search ..................... 165/162; 138/26, 28, 138/30; 220/9 LG, 13, 15, 9 R; 60/413, 418, 508; 91/390; 62/45; 23/252 R, 259, 292

[56] References Cited

U.S. PATENT DOCUMENTS

| | | | |
|---|---|---|---|
| 646,459 | 4/1900 | Place | 220/9 LG UX |
| 1,830,869 | 11/1931 | Charles | 138/30 UX |
| 2,026,423 | 12/1935 | Fiene | 165/1 X |
| 2,337,771 | 12/1943 | Roberts | 138/30 |
| 2,597,050 | 5/1952 | Audemar | 60/536 |
| 3,848,765 | 11/1974 | Dürkop | 220/15 X |

Primary Examiner—Edgar W. Geoghegan
Attorney, Agent, or Firm—Sughrue, Rothwell, Mion, Zinn and Macpeak

[57] ABSTRACT

A process for storing materials under predetermined positive or negative pressure comprising inserting and sealing a fragile storage container within a gas-tight outer container capable of withstanding a pressure differential on opposite sides of its walls respectively greater or less than the said predetermined positive or negative pressure, and substantially filling the interspace between the two containers with a liquid, the fragile container incorporating pressure equalizing means whereby the pressure on opposite sides of the fragile container wall is equalized during the creation of said predetermined positive or negative pressure within the fragile container.

19 Claims, 2 Drawing Figures

PRESSURE VESSELS

BACKGROUND OF THE INVENTION

1. Field of the Invention

This invention relates to a process and apparatus for storing materials under positive or negative pressure in containers such as vessels or pipes, the storage apparatus being capable of use as a reactor vessel.

2. Description of the Prior Art

In many fields, for example in chemical engineering, chemical laboratories or experimental analysis, materials in liquid, gaseous or even solid form have to be stored or conveyed under pressure or under conditions or in processes in which the materials are subject to elevated or reduced pressures or partial vacuum. For this purpose the storage containers used have to be capable of withstanding the pressure differentials between the container outsides and the insides and in many cases the materials are of a corrosive nature so that the containers have to be of materials which are corrosive resistant. The walls of the containers have therefore to be of substantial thickness and especially if they are of corrosive resistant material they are expensive as well as being of substantial weight. This is equally true and in some cases more so for a reactor vessel in which the internal pressure may rise during the reaction between the reactants.

The main object of the present invention is to provide a process and apparatus for storing materials under positive or negative pressure in which the aforesaid disadvantages are minimised.

SUMMARY

According to the present invention a process for storing materials under predetermined positive or negative pressure comprises inserting and sealing a fragile storage container within a gas-tight outer container capable of withstanding a pressure differential on opposite sides of its walls respectively greater or less than the said predetermined positive or negative pressure, and substantially filling the interspace between the two containers with a liquid, the fragile container incorporating pressure equalising means whereby the pressure on opposite sides of the fragile container wall is equalised during the creation of said predetermined positive or negative pressure within the fragile container.

In one preferred construction the liquid does not completely fill the interspace thus leaving above the surface of the liquid a gas ballast zone which being compressible forms a small expansion chamber for the liquid.

The pressure equalising means may comprise a flexible diaphragm sealed in or around an opening in the wall of the fragile container whereby as the pressure within the fragile container increases or decreases under reduced pressure the diaphragm will flex thus transmitting the pressure change to the liquid so that the pressure inside and outside the fragile container is equalised and the fragile container wall is not subjected to any pressure differential across it.

Such a diaphragm may be in the form of a flexible membrane or it may be a flexible bellows device. Alternatively part or the whole of the wall of the fragile container is of flexible material capable of flexing within its elastic limit to effect the pressure equalisation.

The fragile container may have a neck or other portion extending through a gastight gland in the outer container, into which closure means may be secured in a gastight manner and through which may extend such devices as a stirring device, a sparge pipe or a thermometer.

Heating, cooling or freezing devices may be provided within the outer container and/or within the fragile container for varying the temperature within the fragile container to create a change of pressure therein and/or the interior of either of the containers or both of them may be connected to a source of pressure fluid or reduced pressure, such as pumps, for varying the pressure within the fragile container.

The fragile container may be made of thin glass or metal sheet e.g. tantalum sheet of paper thickness since it does not have to resist any pressure from within or from the outside of the container.

In an alternative construction the container may be a pipe or an elongated pipeline within which the fragile container in the form of a smaller diameter pipe is disposed with the liquid substantially filling the interspace between the two pipes.

The invention also includes an apparatus for storing materials under positive or negative pressure comprising a fragile sealable storage container disposed within a gastight outer container capable of withstanding a pressure differential on opposite sides of its walls respectively greater or less than the said predetermined positive or negative pressure, the interspace between the two containers being filled with a liquid, and pressure equalising means incorporated in the fragile container whereby the pressure on opposite sides of the fragile container wall is equalised during the creation of said predetermined positive or negative pressure within the fragile container.

DESCRIPTION OF PREFERRED EMBODIMENTS

Figure 1:
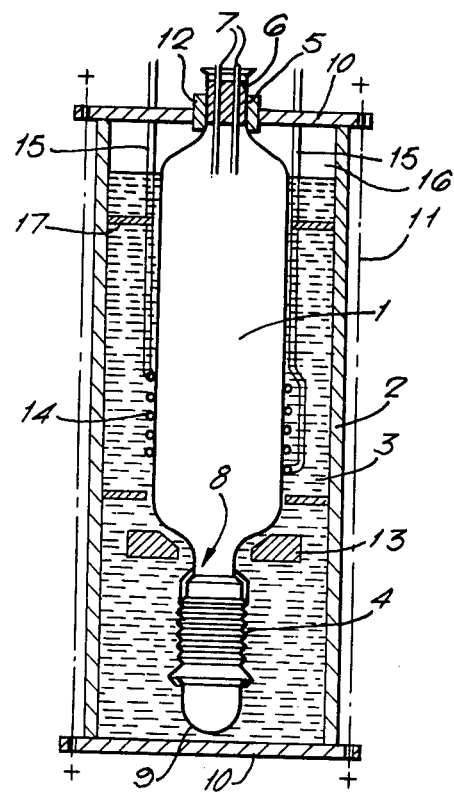
FIG. 1 shows diagrammatically one construction of a sealed storage apparatus, with additional preferred devices.

Referring to FIG. 1 this shows a storage container 1 of fragile material which is disposed within an outer container 2 and the interspace 3 between the two containers is filled with a liquid while the fragile container 1 has a pressure equalising device 4 whereby the pressure on opposite sides of the fragile container wall is equalised during the creation of a predetermined positive or negative pressure within the fragile container as will be explained.

The inner or fragile container 1 in the example shown has a neck 5 at one end closed by a pressure seal, capable of withstanding the pressures developed within the container 1, and which may have as shown bores through it to receive the shanks 7 of devices to be explained. Alternatively the container 1 may have no neck and be closed at the top.

At the lower end of the container 1 there is another neck 8 to which is attached the pressure equalising device 4 in a fluid tight manner. The pressure equalising device is shown as a bellows and in the drawing the bellows is shown as extended as a result of the internal pressure within the vessel 1. The bottom of the bellows device is closed in any suitable manner in a gastight way but in the drawing a cap 9 is used as the closure member.

In an alternative construction the bellows may be replaced by a diaphragm of flexible material which is sealed across the neck 8 or other opening in the wall of the container 1. In yet another construction the wall of the container 1 or part of it may be sufficiently flexible to act as the pressure equalising means.

The wall of the fragile container 1 may be of any suitable material such as glass, ceramics, synthetic plastics, or metal such as tantalum or stainless steel or of any other suitable material which is fitting for the purpose of the container. The thickness of the container wall is such that it would not resist any substantial pressure within it but due to the equalising means in the apparatus of the invention the wall will not be subjected to a differential pressure across it and hence the container can be of very thin almost paper like thickness without risk of destruction due to internal pressure or vacuum.

The outer container 2 may be of suitable material and have a thickness such that it can withstand the pressure differential across it derived from the pressure within the fragile container 1.

The container 2 is closed at each end in a fluid tight manner by end closure members or caps 10 and the fixation of these caps on the container ends may be as indicated in a chain dotted line by bolts 11 but any suitable means may be employed for closing the container in a fluid tight manner. The cap 10 shown in the drawing has the neck 5 of the inner container passing through it and a fluid tight gland 12 is provided between the cap aperture and the neck of the inner container.

The seal 6 in the neck 5 may have bores through it for the members 7 which lead to such equipment as pressure gauges, thermometers, control devices, stirrers, sparge pipes or the like.

The inner or fragile container 1 may be provided with a heating element 13 which may be electric heating coils or any other heating means such as steam heated members or it may be provided with heating coils 14 again electric or steam heating coils supplied through leads 15 passing through the cap 10.

The liquid 3 is preferably not too easily volatile such as diphenyloxide or any other heat transfer oil, or a transformer oil which would form a cooling oil of low volatility. It is possible for the oil to not completely fill the interspace between the containers leaving a gas ballast zone at the top 16. The thermal expansion of the hydraulic oil would largely be taken up by the pressure equalising device 4 or the inert gas ballast could be applied above the liquid level which being compressible would accommodate thermal expansion of the hydraulic medium and would not retard the operation of the pressure equalising device 4.

Control devices such as switches may be incorporated in the pressure equalising device 4 and responsive to the temperature or pressure within the fragile container and/or the interspace, such that when the deformation of the pressure equalising means reaches a dangerous level the heating or other process going on within the fragile container 1 would be automatically shut down. This could equally take place in the event of there being a leakage of oil from the interspace between the containers which might lead to a dangerous burst of the inner container 1.

The inner container 1 although shown as of generally cylindrical shape could be spherical or any other shape or configuration which would fit the shape of the outer container and both containers may be so shaped as to make a suitable fit, one within the other.

Figure 2:
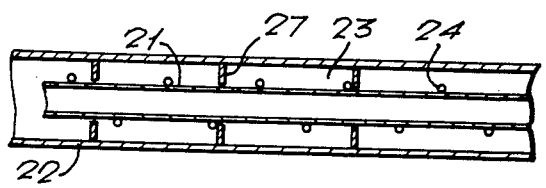
FIG. 2 shows diagrammatically an alternative construction also with additional preferred devices.

In an alternative construction shown in FIG. 2 the fragile inner container is shown as a pipe 21 and it is located within a pipe 22 with the interspace filled with the oil at 23.

In all the constructions locating means 17 and 27 may be provided to facilitate the stable location of the inner container within the outer container.

By using a pipeline such as shown in FIG. 2 the oil will protect the fragile or brittle tube 21 and if the tube 21 is a glass pipe then that pipe will be protected from a point of application of a blow by spreading the force of the blow on the outer pipe 22 over the entire hydraulic system. It is also possible for there to be trace heating by a coil 24 round the inner pipe if this is desired, and/or the liquid can be heated and the liquid may be heated and caused to flow through the interspace.

Although the preferred construction has been described with reference to the drawings the pressure equalising device could also be in the form of a piston sliding in a cylinder providing there is an adequate seal between the piston and the cylinder wall to prevent leakage from one container into the other: the piston movement under increased pressure could be against the action of a spring or other resilient means such as a gas ballast trapped in the cylinder and which need only be sufficient to take up the expansion of the stored materials or reactants in the vessel 1.

Where the vessel 1 is used as a reactor, the reactants may be separated by a membrane capable of disruption by the chemical or physical action of one or both of the reactants.

Thus by means of the present invention the thin walled containers can be of flexible or brittle materials or materials which are unable to withstand pressure differentials across them and where these containers have to be formed of expensive materials, considerable saving in cost is provided by the minimum amount of materials being used. Also by means of the present invention dangerous materials which have to be stored under pressure or vacuum can be safely accommodated with greatly reduced risk, compared with known devices, of explosions and leakages.

I claim:

1. A process for storing materials under predetermined positive or negative pressure comprising inserting and sealing within an outer pressure resistant container a fragile storage container incapable of withstanding a pressure differential on opposite sides of its walls respectively greater or less than the said predetermined positive or negative pressure, and substantially filling the interspace between said two containers with a liquid, said fragile container incorporating pressure equalising means whereby the pressure on opposite sides of said fragile container wall is equalised during the creation of said predetermined positive or negative pressure within said fragile container.

2. A process according to claim 1 wherein said interspace is not completely filled with oil thus leaving above the surface of said liquid a gas ballast zone which being compressible forms a small expansion chamber for said liquid.

3. A process according to claim 1 wherein said pressure equalising means comprises a flexible diaphragm sealed in or around an opening in the wall of said fragile container whereby as the pressure within said fragile container increases or decreases said diaphragm will flex thus transmitting the pressure change to the liquid so that the pressure inside and outside said fragile container is equalised and said fragile container wall is not subjected to any pressure differential across it.

4. A process according to claim 3 wherein said diaphragm is in the form of a flexible membrane or bellows device.

5. A process according to claim 1 wherein said pressure equalising means is provided by forming at least part of the wall of said fragile container of flexible material capable of flexing within its elastic limit to effect pressure equalisation.

6. A process according to claim 1 wherein at least one of heating, cooling and freezing devices are provided within said outer container for varying the temperature within said fragile container to create a change of pressure therein.

7. A process according to claim 1 wherein heating, cooling or freezing devices are provided within said fragile container for varying the temperature within said fragile container to create a change of pressure therein.

8. A process according to claim 1 wherein the interior of said outer container and/or the fragile container is connected to a source of fluid pressure or reduced pressure for varying the pressure in the fragile container.

9. A storage apparatus for storing materials under a predetermined positive or negative pressure comprising a fragile sealable storage container incapable of withstanding a pressure differential on opposite sides of its walls respectively greater or less than the said predetermined positive or negative pressure and disposed within a gas-tight outer container capable of withstanding a pressure differential on opposite sides of its walls respectively greater or less than the said predetermined positive or negative pressure, the interspace between said two containers being filled with a liquid, and pressure equalising means incorporated in said fragile container whereby the pressure on opposite sides of said fragile container wall is equalised during the creation of said predetermined positive or negative pressure within said fragile container.

10. A storage apparatus according to claim 9 wherein said liquid does not completely fill said interspace between said containers thereby leaving a compressible gas ballast zone acting as an expansion chamber for the liquid.

11. A storage apparatus according to claim 9 wherein said pressure equalising means comprises a flexible diaphragm sealed in or around an opening in the wall of said fragile container whereby as the pressure within said fragile container increases or decreases under reduced pressure said diaphragm will flex thus transmitting the pressure change to said liquid so that the pressure inside and outside said fragile container is equalised and said fragile container wall is not subjected to any pressure differential across it.

12. A storage apparatus according to claim 11 wherein said diaphragm is in the form of a flexible bellows device or membrane.

13. A storage apparatus according to claim 9 wherein said pressure equalising means is provided by forming at least part of the wall of said fragile container of flexible material capable of flexing within its elastic limit to effect the pressure equalisation.

14. A storage apparatus according to claim 9 wherein said two containers comprise pipes of different diameters one located within and spaced from the inner wall of the other, the ends of said pipes being sealable with gas-tight seals, and the interspace being filled or substantially filled with liquid.

15. A storage apparatus according to claim 9 wherein said fragile container has at least one opening or neck portion each extending through a gas-tight gland in the outer container, into which closure means may be secured in a gas-tight manner and through which at least one of a stirring device, a sparge pipe, a thermometer and other members can be passed in a gas-tight manner.

16. A storage apparatus according to claim 9 wherein at least one of heating, cooling and freezing devices are provided within at least one of said container and said fragile container for varying the temperature within said fragile container to create a change of pressure in at least one of said containers.

17. A storage apparatus according to claim 9 wherein the interior of at least one of said outer container and said fragile container is connected to a source of pressure or reduced pressure for varying the pressure in said fragile container.

18. A storage apparatus according to claim 9 wherein said fragile container is made of material selected from thin glass, and metal sheet e.g. tantalum sheet of paper thickness.

19. A storage apparatus according to claim 9 wherein control means are provided in association with said pressure equalising device and responsive to at least one of the pressure and temperature within said fragile container and/or the interspace to shut down the apparatus automatically if the deformation of said pressure equalising means reaches a dangerous level.

* * * * *